July 31, 1973  F. W. SKRABA  3,749,753
PURIFICATION OF HF CATALYST IN ALKYLATION PROCESS
Filed April 15, 1971  2 Sheets-Sheet 1

INVENTOR.
F.W. SKRABA
BY Young & Quigg
ATTORNEYS

# United States Patent Office 3,749,753
Patented July 31, 1973

3,749,753
PURIFICATION OF HF CATALYST IN
ALKYLATION PROCESS
Frank W. Skraba, Old Ocean, Tex., assignor to
Phillips Petroleum Company
Filed Apr. 15, 1971, Ser. No. 134,146
Int. Cl. C07c 3/12, 3/54
U.S. Cl. 260—683.48    5 Claims

ABSTRACT OF THE DISCLOSURE

Olefins and isoparaffins are alkylated in the presence of an HF catalyst. The reactor effluent is passed to a settling zone. The hydrocarbon phase is fractionated to recover an alkylate product. The acid phase is recycled to the reactor. A portion of the recycled acid is passed to a purification column for removal of acid soluble oil. Stripping vapor is introduced into the purification column both above and below the surface of said soluble oil accumulated therein.

---

It is common practice in the petroleum industry to produce high octane motor fuel by alkylating olefins with isoparaffins in the presence of a hydrogen fluoride (HF) catalyst. The effluent from the alkylation reactor is usually pased to a settling vesel wherein a hydrocarbon phase is separated from an acid phase. The hydrocarbon phase is fractionated to separate low boiling hydrocarbons from the alkylate product. The acid phase is recycled to the reactor. However, it is necessary to purify a portion of the recycled acid in order to prevent a buildup of acid soluble oil (ASO) in the system. This purification is usually accomplished by passing an HF-containing stream from the settler to a purification column wherein HF is stripped from the ASO by means of a vaporous hydrocarbon such as isobutane. While the HF purification systems employed heretofore have generally been effective to produce an acid stream having the required purity, the ASO stream from the purification unit often has contained undesirable amounts of HF. This has required subsequent purification steps to remove the HF before the ASO is recycled to the refinery or passed to a disposal unit.

In accordance with one embodiment of this invention, a method is provided for operating an HF purification unit so as to produce an HF containing stream of low ASO content and to produce an ASO stream of low HF content. This is accomplished by introducing a first portion of the stripping hydrocarbon into the purification unit at a region above the liquid which is accumulated in the bottom of the unit. A second portion of the stripping hydrocarbon is sparged into the lower region of the accumulated liquid to provide additional stripping of HF from the ASO. In accordance with another embodiment of this invention, all of the stripping hydrocarbon is introduced periodically into the lower region of the accumulated liquid. Both of these procedures provide additional heating and stripping of the ASO to break down organic fluorides, which results in greater recovery of HF.

Figure 1:
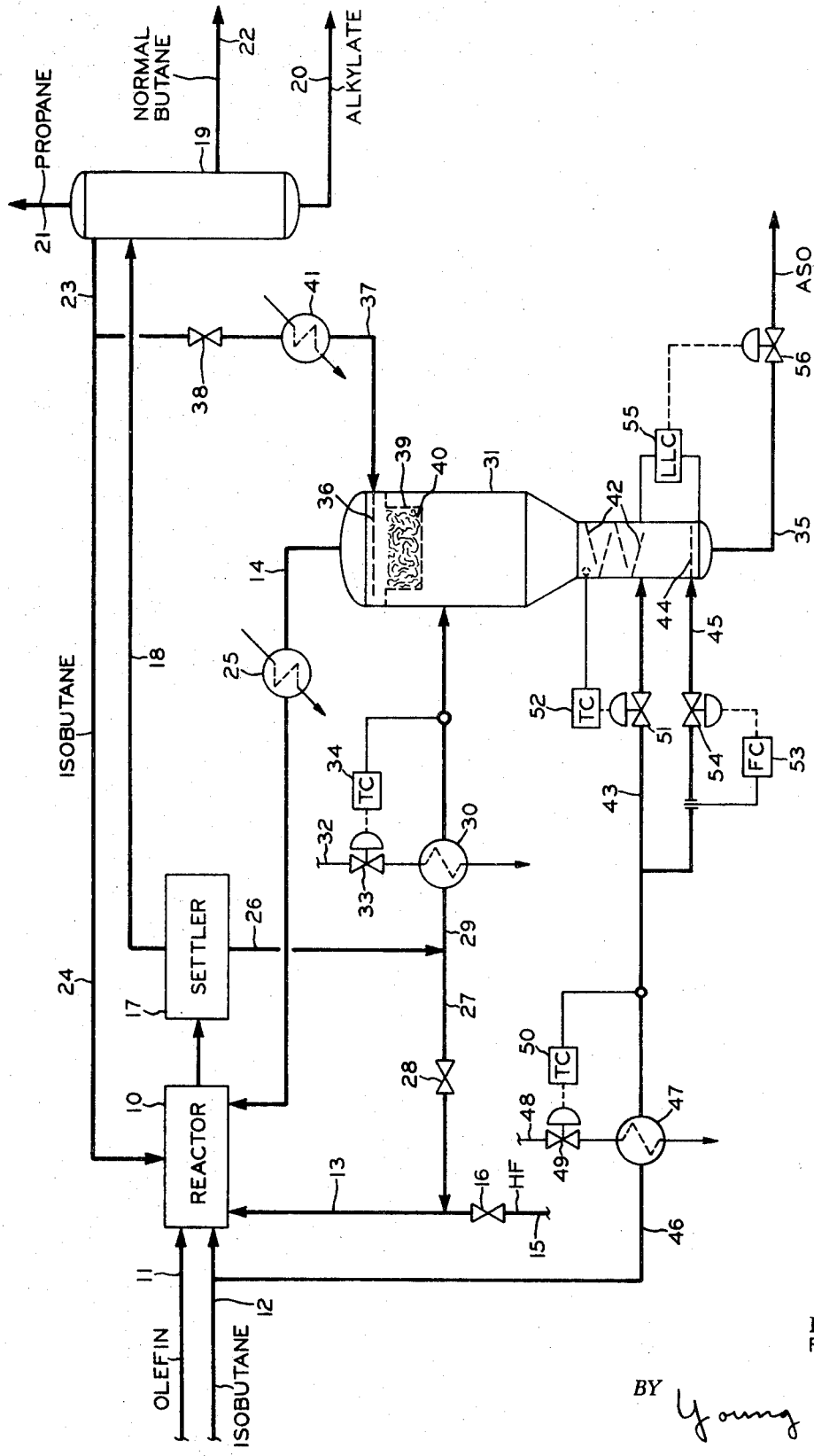
Figure 2:
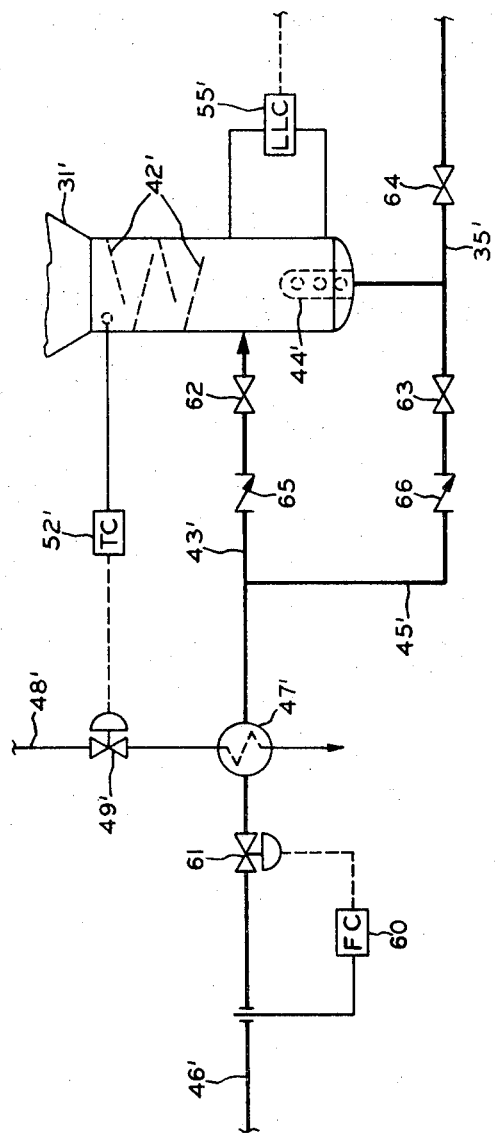

In the accompanying drawing, FIG. 1 is a schematic representation of an HF alkylation process employing a purification unit of this invention. FIG. 2 is a schematic representation of a second embodiment of a portion of the purification unit.

Referring now to the drawing in detail and to FIG. 1 in particular, there is shown an alkylation reactor 10. An olefin feed stream is introduced through a conduit 11 and an isoparaffin feed stream is introduced through a conduit 12. The olefin feed generally comprises one or more olefins having from 2 to 5 carbon atoms, while the isoparaffin stream generally comprises isobutane and/or isopentane. In a typical operation, the olefin feed comprises a mixture of propylene and butylenes, while the isoparaffin feed comprises primarily isobutane. A catalyst comprising hydrogen fluoride is introduced into reactor 10 through conduits 13 and 14 from sources to be described. In a typical operation, the HF is in the liquid phase and has a purity of about 90%. Fresh makeup catalyst can be introduced as required through a conduit 15 which has a valve 16 therein. The effluent from reactor 10 is passed to a settler 17 in which a phase separation is made between the acid and hydrocarbons. The hydrocarbon phase is removed through a conduit 18 and passed to a fractionator 19. The fractionator is operated to produce a bottoms alkylate product stream which is removed through a conduit 20, an overhead propane stream which is removed through a conduit 21, a normal butane stream which is removed through a side conduit 22, and an isobutane stream which is removed through a side conduit 23. The isobutane is recycled to reactor 10 through a conduit 24.

The acid phase is removed from settler 17 through a conduit 26. A portion of this stream is recycled to conduit 13 through a conduit 27 which has a valve 28 therein. The remainder of the HF is passed through a conduit 29, which has a heat exchanger 30 therein, to an acid purification column 31. Steam or other heating medium is passed through heat exchanger 30 by means of a conduit 32 which has a control valve 33 therein. Valve 33 is regulated by a temperature controller 34 in response to a measurement of the temperature of the HF stream introduced into column 31, thereby maintaining a desired feed temperature of the acid stream. This temperature is sufficiently high to flash at least a substantial portion of the HF as it enters column 31. A purified HF and isobutane stream is removed from the top of column 31 through conduit 14 and recycled to reactor 10. Conduit 14 has a condenser 25 therein. An ASO stream is removed from the bottom of column 31 through a conduit 35.

An isobutane reflux stream is sprayed into the top of column 31 by means of a spray head 36. This isobutane can be obtained by passing a portion of the isobutane flowing through conduit 23 through a conduit 37, which has a cooler 41 and a valve 38 therein, to spray head 36. As an alternative, some or all of the reflux isobutane can be obtained from feed stream 12. A basket 39 which is filled with packing material, such as Raschig rings 40, is disposed in the upper region of column 31 to provide contact between the rising vapor in the column and the reflux liquid. As an alternative, trays can be disposed in the column to provide contacting between the two fluids.

HF is stripped from the ASO in column 31 by means of vaporous hydrocarbons which are introduced into the lower region of the column. The lower section of column 31 is provided with a plurality of contacting trays 42, which can be of the type described in U.S. Pat. 3,410,759, for example. Vaporous isobutane is introduced at a region beneath the lowermost tray by means of a conduit 43. Additional vaporous isobutane is introduced through a sparger 44 which is submerged in accumulated liquid in the bottom of column 31. A conduit 45 communicates with sparger 44 to introduce this additional vaporous stream. A conduit 46, which has a heat exchanger 47 therein, extends between feed conduit 12 and conduits 43 and 45. Steam or other heating medium is circulated through heat exchanger 47 by means of conduit 48 which has a control valve 49 therein. Valve 49 is adjusted by a temperature controller 50 which responds to the temperature of the heated isobutane stream, thereby maintaining a desired temperature of the stripping isobutane feed.

A control valve 51 is disposed in conduit 43. This valve is adjusted by a temperature controller 52 which responds to a measurement of temperature at the top of the stripping section of column 31 to tend to maintain a constant temperature at this region. A predetermined rate of flow of isobutane is maintained through conduit 45 by means of a flow controller 53 which regulates a valve 54. The flow of ASO from the bottom of column 31 is regulated by a liquid level controller 55 which adjusts a valve 56.

In a typical example of this invention, column 31 is employed to purify an acid stream obtained from the settler of an HF alkylation reaction in which a mixture of propylene and butylenes is alkylated with isobutane. The upper section of column 31 is about twelve feet long and has a diameter of about five feet. The lower section is about twelve feet long and has a diameter of about two feet. Some twelve trays 42 are emyloyed. Acid from settler 17 is introduced into column 31 at a rate of about 240 barrels per day, and at a temperature of about 285° F. Liquid isobutane reflux at a temperature of about 70° F. is introduced through conduit 37 at a rate of about 72 barrels per day. Vaporous isobutane at a temperature of about 330° F. is introduced through conduit 43 at a rate of about 204 barrels per day (based on liquid volume) and through conduit 45 at a rate of about 204 barrels per day (based on liquid volume). ASO at a temperature of about 318° F. is removed through conduit 35 at a rate of about thirteen barrels per day. This ASO contains about eight pounds of HF per day, with a water content of about 0.4 weight percent. Column 31 is operated at a pressure of about 100 p.s.i.g.

The flow rates of stripping vapor introduced through conduits 43 and 45 can be adjusted from time to time by manipulation of the set points of controllers 52 and 53. Normally, a maximum amount of stripping vapor is employed to minimize the HF content of the ASO bottoms stream. However, a practical limit is imposed by the ASO content of the stream recycled through conduit 14. It is necessary to prevent excessive buildup of ASO in the alkylation system. Because of low flow rates of liquid through the stripping trays 42, some free acid creeps down the wall of the stripping section, resulting in poor recovery of free HF from the ASO. The introduction of hot HF-free isobutane vapors to the bottom of the ASO liquid removes this remaining free HF acid. In addition, heating of the liquid ASO breaks down organic fluorides which results in additional recovery of HF acid.

In a typical operation conducted prior to this invention, the same quantity of acid is treated in column 31. However, the feed and bottom temperatures are 265° F. and 260° F., respectively. The flows of stripping and reflux isobutane are each 96 barrels per day. All of this stripping vapor is introduced above the liquid level in column 31. Other operating conditions are the same as described above. In this prior operation, ASO is removed through conduit 35 at a rate of about 29 barrels per day. This ASO contains about 1910 pounds of HF and about 5 weight percent water. Thus, operating in accordance with the invention permits the HF content of the ASO stream to be reduced from about 1910 pounds per day to about 8 pounds per day. This greatly simplifies the disposal problem of the ASO, and permits recovery of a substantial amount of additional HF catalyst.

A second embodiment of this invention is illustrated in FIG. 2, wherein elements corresponding to those illustrated in FIG. 1 are designated by like primed reference numerals. In FIG. 2, temperature controller 52' adjusts valve 49' instead of a valve in conduit 43'. A flow controller 60 regulates a valve 61 in conduit 46'. Conduit 45' communicates with product removal conduit 35' which normally removes ASO through a sparger 44' in the bottom of column 31'. Valves 62, 63 and 64 are disposed in respective conduits 43', 45' and 35'. Check valves 65 and 66 are disposed in respective conduits 43' and 45'.

In normal operation, valves 62 and 64 are open and valve 63 is closed. Periodically an operator closes valve 64 and opens valve 63. This introduces stripping vapor into the bottom of the column to strip additional HF from the ASO accumulated in the bottom of the column. Such an additional stripping operation can take place every hour or so for ten to fifteen minutes and can be carried out automatically by use of a timer to open and close the valves.

While this invention has been described in conjunction with presently preferred embodiments, it obviously is not limtied thereto.

What is claimed is:

1. In an alkylation process employing an HF catalyst, in which the effluent from the reaction zone is passed to a settling zone to remove a stream containing HF and acid soluble oil; the method of purifying said stream which comprises introducing said stream into an intermediate region of a vertically extending separation zone at a temperature sufficiently high to vaporize HF in said stream; introducing liquid hydrocarbon into the upper region of said separation zone as a reflux; removing an acid soluble oil stream from the bottom of said separation zone, the rate of removal of said acid soluble oil stream being such that there is an accumulation of acid soluble oil in the lower region of said separation zone; introducing vaporous hydrocarbon into said separation zone at a location beneath the surface of the accumulated acid soluble oil; and removing a stream containing purified HF from the top of said separation zone.

2. The method of claim 1, further comprising introducing additional vaporous hydrocarbon into said separation zone at a location above the surface of the accumulated acid soluble oil but below said intermediate region so that the additional vaporous hydrocarbon contacts acid soluble oil descending from said intermediate zone.

3. The method of claim 2 wherein the vaporous hydrocarbon introduced below the surface of the acid soluble oil and said additional vaporous hydrocarbon are introduced at substantially the same temperature.

4. The method of claim 3 wherein said additional vaporous hydrocarbon is introduced at a rate so as to maintain a constant temperature at a location within said separation zone between said intermediate region and said location at which the additional vaporous hydrocarbon is introduced.

5. The method of claim 2 wherein said additional vaporous hydrocarbon is introduced continuously and the vaporous hydrocarbon introduced beneath the surface of the acid soluble oil is introduced intermittently.

References Cited
UNITED STATES PATENTS

| | | | |
|---|---|---|---|
| 3,410,759 | 11/1968 | Fontenot et al. | 260—683.48 |
| 3,478,125 | 11/1969 | Chapman | 260—683.48 |
| 2,574,006 | 11/1951 | Allen | 260—683.44 |
| 3,171,865 | 3/1965 | Davison | 203—70 X |
| 3,206,524 | 9/1965 | Plaster | 203—70 X |
| 2,554,425 | 5/1951 | Storment | 202—181 X |

NORMAN YUDKOFF, Primary Examiner

D. EDWARDS, Assistant Examiner

U.S. Cl. X.R.

159—16; 202—181; 203—70, 88